(12) United States Patent
Brown et al.

(10) Patent No.: US 10,506,026 B1
(45) Date of Patent: Dec. 10, 2019

(54) RESOURCE PRESTAGING

(71) Applicant: Amazon Technologies, Inc., Reno, NV (US)

(72) Inventors: David Everard Brown, Cape Town (ZA); Eugene Michael Farrell, Sammamish, WA (US); George Oliver Jenkins, Redmond, WA (US); Thomas Christopher Rizzo, Sammamish, WA (US); Kent David Forschmiedt, Shoreline, WA (US); Deepak Suryanarayanan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 451 days.

(21) Appl. No.: 13/801,224

(22) Filed: Mar. 13, 2013

(51) Int. Cl.
*H04L 29/08* (2006.01)

(52) U.S. Cl.
CPC ................ *H04L 67/1008* (2013.01)

(58) Field of Classification Search
CPC ............ H04L 29/08144; H04L 29/06; H04L 29/08072; H04L 29/08171; H04L 12/5695; H04L 67/1008; G06F 9/45558; G06F 2009/4557
USPC ............. 709/226; 717/103, 174; 718/1, 104
See application file for complete search history.

(56) References Cited

U.S. PATENT DOCUMENTS

| | | | | |
|---|---|---|---|---|
| 6,928,644 B1* | 8/2005 | Kroening | ................... | G06F 8/63 717/121 |
| 7,140,028 B2* | 11/2006 | Bentley | ..................... | G06F 8/71 719/319 |
| 7,379,982 B2* | 5/2008 | Tabbara | ........................ | 709/220 |
| 7,577,722 B1* | 8/2009 | Khandekar | ......... | G06F 9/45558 709/220 |
| 7,577,959 B2* | 8/2009 | Nguyen | .............. | G06F 9/45558 709/203 |
| 7,793,288 B2* | 9/2010 | Sameske | ............... | G06F 9/5077 718/1 |
| 8,065,676 B1* | 11/2011 | Sahai | .................... | G06F 9/5077 709/226 |
| 8,250,581 B1* | 8/2012 | Blanding | .............. | G06F 9/5011 709/226 |
| 8,271,998 B2* | 9/2012 | Dettori | ..................... | G06F 8/24 709/201 |

(Continued)

*Primary Examiner* — Vivek Srivastava
*Assistant Examiner* — Binod J Kunwar
(74) *Attorney, Agent, or Firm* — Kilpatrick Townsend & Stockton LLP

(57) ABSTRACT

A service management system prepares computing resources for use before a client requests the resource. For example, a service management system of a provider may restore an operating system image to a volume. The service management may then assign a processing resource to the volume to form a virtual machine. The service management system may cause the processing resource to finish preparation of the operating system on the volume. The service management system may disconnect the resulting staged volume from the processing resource. The staged volume may remain active in the low-latency data store and be added to a list of available staged volumes having the operating system. When a client requests a virtual machine having an operating system, the service management system may determine that the client receives the staged volume as part of the virtual machine to avoid the start-up costs of preparing a volume.

22 Claims, 12 Drawing Sheets

(56) References Cited

U.S. PATENT DOCUMENTS

| | | | | |
|---|---|---|---|---|
| 8,305,911 B2* | 11/2012 | Diwakar | H04J 3/22 | 370/229 |
| 8,458,658 B2* | 6/2013 | Faus | G06F 8/61 | 717/106 |
| 8,468,518 B2* | 6/2013 | Wipfel | G06F 8/61 | 717/168 |
| 8,549,515 B2* | 10/2013 | Bobroff | G06F 8/63 | 718/1 |
| 8,935,701 B2* | 1/2015 | Bakman | G06F 11/008 | 718/104 |
| 8,954,953 B2* | 2/2015 | Gala et al. | | 717/174 |
| 9,081,623 B1* | 7/2015 | Magerramov | | G06F 9/50 |
| 9,229,711 B2* | 1/2016 | Arasaratnam | | G06F 9/45558 |
| 2002/0156877 A1* | 10/2002 | Lu | G06F 8/63 | 709/221 |
| 2004/0054698 A1* | 3/2004 | Iwami et al. | | 707/204 |
| 2005/0050539 A1* | 3/2005 | Burkhardt et al. | | 717/174 |
| 2005/0071847 A1* | 3/2005 | Bentley | G06F 8/71 | 719/310 |
| 2006/0224436 A1* | 10/2006 | Matsumoto | G06Q 30/0283 | 709/226 |
| 2007/0061210 A1* | 3/2007 | Chen | G06Q 10/087 | 705/22 |
| 2007/0283282 A1* | 12/2007 | Bonfiglio | G06F 8/71 | 715/762 |
| 2007/0283347 A1* | 12/2007 | Bobroff et al. | | 718/1 |
| 2008/0172673 A1* | 7/2008 | Naik | G06F 9/505 | 718/104 |
| 2009/0013061 A1* | 1/2009 | Winter | G06F 9/4416 | 709/222 |
| 2009/0113420 A1* | 4/2009 | Pawlowski | G06F 9/5083 | 718/1 |
| 2009/0300173 A1* | 12/2009 | Bakman | G06F 11/008 | 709/224 |
| 2010/0017801 A1* | 1/2010 | Kundapur | G06F 9/45558 | 718/1 |
| 2010/0138832 A1* | 6/2010 | Kim et al. | | 718/1 |
| 2010/0153945 A1* | 6/2010 | Bansal | G06F 9/4881 | 718/1 |
| 2011/0029970 A1* | 2/2011 | Arasaratnam | G06F 9/45558 | 718/1 |
| 2011/0246627 A1* | 10/2011 | Kern | G06F 9/5072 | 709/220 |
| 2011/0289205 A1* | 11/2011 | Hansson et al. | | 709/224 |
| 2012/0198447 A1* | 8/2012 | Osogami | G06F 9/5066 | 718/1 |
| 2013/0042219 A1* | 2/2013 | Said | G06F 8/436 | 717/103 |
| 2013/0060946 A1* | 3/2013 | Kenneth | G06F 12/0866 | 709/226 |
| 2014/0007097 A1* | 1/2014 | Chin | G06F 9/45533 | 718/1 |
| 2014/0137101 A1* | 5/2014 | Chan | H04L 67/34 | 717/176 |
| 2014/0137110 A1* | 5/2014 | Engle | G06F 9/5022 | 718/1 |
| 2014/0250215 A1* | 9/2014 | Bowen | | 709/223 |

* cited by examiner

RESOURCE PRESTAGING

BACKGROUND

Data centers provide computing resources for use by one or more clients. These services may include computing, storage and networking services. For example, a data center may provide a machine to host an application, storage to store application data, cache to quickly respond to repeated data requests and networking to enable communication between resources. By making use of the data center services, a customer may pay for computing and/or resource use rather than purchasing anticipated hardware needs. This enables a customer to expand and contract use of computing services according to demand. For example, an application may be configured to request more storage as needed rather than a developer or administrator monitoring and anticipating use.

In response to a client requesting a computing resource, the data center may provision the requested resource and provide the resource to the client account. For example, a client may request a virtual machine running a copy of an operating system. In response to the request, the data center may assign a processing resource and volume to a client account to form the virtual machine. Using the processing resource, the data center may install the operating system on the volume. After installation, control of the virtual machine may be turned over to the client.

BRIEF DESCRIPTION OF THE DRAWINGS

Various embodiments in accordance with the present disclosure will be described with reference to the drawings, in which.

DETAILED DESCRIPTION

Figure 1:
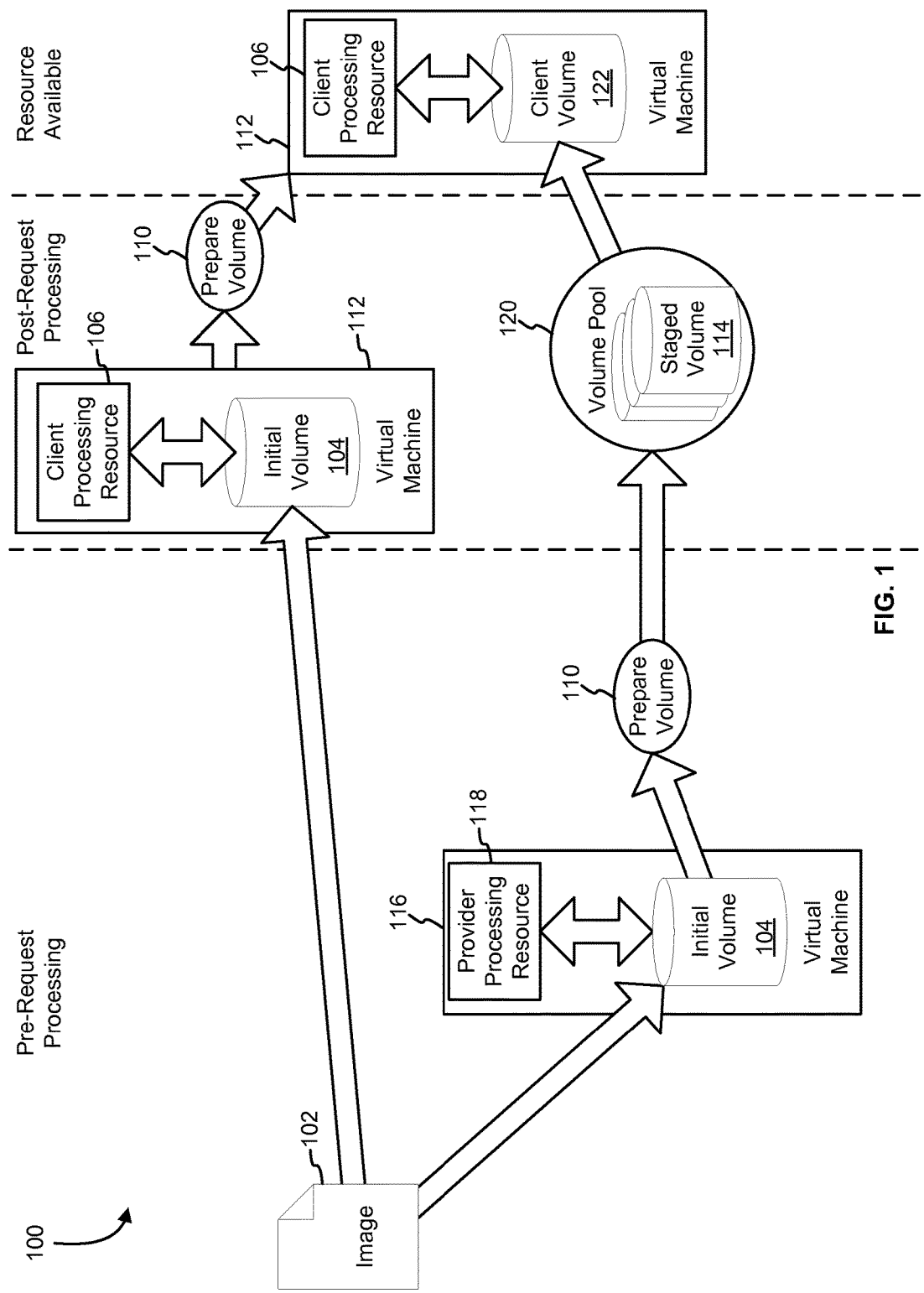
FIG. 1 shows an illustrative example of a system for volume prestaging in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include preparing computing resources for use before a client requests the resource. For example, a service management system of a provider may restore an image having an operating system from an archive to a volume in a low-latency data store. The service management may then assign a processing resource, such as one or more shares of computer processor time, to the volume to form a virtual machine (i.e., virtual computer system). The service management system may cause the processing resource to prepare an instance of the operating system on the volume for use. This may include generating system specific information, such as keys, credentials and/or identifiers. Once the preparation is complete, the service management system may disconnect the staged volume from the processing resource. The staged volume may remain active in the low-latency data store and be added to a list of available staged volumes having the operating system. When a client requests a virtual machine having an operating system, the service management system may determine that the client receives the staged volume. The control of the volume may be changed to the client. The service management system may assign a processing resource to the client. The service management may then connect the processing resource and the volume to form a virtual machine and turn control of the virtual machine to the client.

In some embodiments, the entire virtual machine may remain active under the service management system until requested by a client. For example, the service management system may restore a snapshot to a volume, assign a processing resource and perform the preparation of the operating system. However, instead of disconnecting the processing resource as was done in the previously explained embodiment, the service management system may allow the volume and processing resource to remain active and connected. When a client requests a virtual machine having an operating system, the service management system may transfer control of the processing resource and volume to the client. This may allow a client to immediately begin use of the virtual machine. By using a preparation process and providing volumes or virtual machines in a prepared state, a time between a request for a virtual machine and receiving the active virtual machine may be reduced.

In some embodiments, the image may be a generalized version of a previously created virtual machine. In one embodiment, a client may configure a virtual machine in a desired way. This configuration may include installation of applications, drivers, frameworks and/or libraries. The configuration may then be generalized for use with other machines. For example, a client may use a Microsoft® Sysprep executable to generalize the current virtual machine setup for cloning to other virtual machines. The generalized image of the virtual machine may then be stored in a high durability data store. When needed, the service management system may restore the image to a new virtual machine and perform a staging preparation that makes the generalized image specific to the new virtual machine, such as providing identifiers, keys, credentials or other information specific to the virtual machine.

The service management system may also provide a fallback position if no staged volumes or virtual machines are available. In one embodiment, a client request for a virtual machine with an operating system is received. If the set of staged volumes with the operating system is empty, the service management system may select a provider processing resource that can be utilized to perform a preparation of the operating system on the volume. In an embodiment, the provider processing resource is larger than the client processing resource requested by the client such that the preparation may be more quickly performed. In some embodiments, the image is streamed to the volume such that the preparation may begin even before the volume has received a full copy of the image. If the system preparation program requests data that is not yet available on the volume, the requested data may be delivered out of order to satisfy the request. After the preparation is complete, the staged volume may be transferred to the account of the client and the client processing resource attached. In other embodiments, a fallback position is to provision the volume, assign the volume to the client account, link the client processing resource to the client volume, copy the image to the volume and perform the preparation under the client account.

In some embodiments, the service management system may monitor usage of images and use the information to stage volumes. The service management system may predict usage and receive scheduled usage information. In one embodiment, the service management system may predict expected usage of virtual machines based on one or more volumes. Based on this predicted behavior, a plurality of sets of prepared resources, such as virtual machines and/or volumes, may be created. Based on this prediction, the service management system may create sets of prepared resources, such as through performing system preparation on volumes. In another embodiment, the service management system may receive information about scheduled usage of images. For example, a client may notify the service management system that three hundred servers based on an image will be requested nightly. Based on this scheduled behavior, a set of prepared resources, such as virtual machines and/or volumes, may be created to meet the scheduled demand.

It should be recognized that, while the discussion has centered around preparation relating to operating systems for clarity, the systems and processes discussed may be used in preparation of computing resources that require pre-processing information. In one embodiment, an application may be staged to a volume. After a staging of the application, a client may request installation of the application. In response to the request, the service management system may transfer control of the volume to the client and connect the volume to a virtual machine. The virtual machine may then use the application.

It should be recognized that a connection and the act of connecting may be physical, mechanical, virtual, direct, indirect or otherwise. For example, when a volume is connected to a processing resource, the volume may exist on a data storage server which is connected to a processing server over a network. There may be virtualization, protocols, hardware and other intermediaries that pass information between the processing resource and a volume.

It should be recognized that control, when used herein, means assignment to an account. For example, a client may have control of a volume when the volume is assigned to the account of the client. While the physical hardware that supports the volume may remain the property of the data center provider, the volume may be owned by a client.

Turning now to FIG. 1, an illustrative example of a system 100 for volume prestaging in accordance with at least one embodiment is shown. An image 102 of a volume is pre-processed by a provider processing resource 118 to be stored in a volume pool 120 until requested by a client. If the volume pool 120 is depleted, as a fallback, the image may be sent to an initial volume 104 and processed using a client processing resource 106. By using a preparation process and providing volumes in a prepared state from a volume pool 120, a time between a request for a virtual machine and receiving the active virtual machine 112 may be reduced.

An image 102 may be copied to an initial volume 104 and pre-processed to a staged volume 114 before a client request is received. In one embodiment, an image is copied to an initial volume 104 that has not yet been processed. A service management system connects the initial volume 104 to a provider processing resource 118 to form a provider virtual machine 116. In one embodiment, the provider processing resource 118 may be a processing resource selected from available processing resources. In another embodiment, the provider processing resource 118 may be selected from a pool of provider processing resources that are used for staging operations. The provider virtual machine 116 may prepare 110 the initial volume 104 to become a staged volume 114 in a volume pool 120. A staged volume 114 from the volume pool 120 can be selected for use with a client processing resource 106 to form a client virtual machine 112 with the staged volume 114 transitioning to a client volume 122. In some embodiments, preparing an initial volume includes performing a staging preparation that makes a generalized image 102 copied to the initial volume 104 specific to the new virtual machine, such as providing identifiers, keys, credentials or other information specific to the virtual machine. In other embodiments, preparing an initial volume 104 comprises preparing an operating system on the volume for use. In one embodiment, preparing an initial volume 104 comprises installing an application to the initial volume 104. After preparing 110 a staged volume 114 from an initial volume 104, the provider processing resource may be disconnected from the staged volume 114. The staged volume 114 may be added to a volume pool 120. Another advantage of pre-processing is that a provider resource 118 may be used for the pre-processing. The provider resource 118 may be configured, such as with a fast processor or specialized hardware, to more quickly perform a preparation of programs, such as the operating system, on the initial volume 104 than might be selected by a client. Yet another advantage may be that compute time charges for a client may be avoided by performing the preparation using provider resources 116.

A staged volume 114 from the volume pool 120 may be transferred to a client upon request. In some embodiments a client requests a client virtual machine 112 having an operating system. In other embodiments a client requests a staged volume 114 to connect to a client processing resource 106. In response to the request, the service management system may select a staged volume 114 from the volume pool 120. The selection of the staged volume 114 may be performed based on selection parameters that would have been used to provision a new volume from the service management system. In one embodiment, the selection parameters may be based on placement in a data center. For example, a volume may be selected such that a router is shared between the client processing resource and a physical host of the staged volume 114. In another embodiment, the selection criteria may be based on size. For example, a staged volume 114 with the capability of expanding size to a requested amount may be selected. The service management system may transfer control of the staged volume 114 to the client. The staged volume 114 and client processing resource 106 may be connected to form a client virtual machine 112. The service management system may then turn control of the client virtual machine 112 to the client.

The service management system may use a fallback position if the volume pool 120 cannot meet a demand for staged volumes 114. The image 102 is copied to an initial volume 104. A client processing resource 106 may be connected to the initial volume 104 to form an initial client virtual machine 112. The initial client virtual machine 112 may be used to prepare the volume 110, such as for finishing a staging preparation of an operating system. In some embodiments, the image may be streamed to the initial volume 104 such that preparing 110 the initial volume 104 may begin earlier. If a portion of data is requested that is not yet streamed to the initial volume 104, the service management system may request the needed data from the image 102 out of order such that the preparation may continue. After preparing 110 the initial volume 104, the volume may be prepared for use by the client virtual machine 112. By using a fallback position, the service management system may incorrectly predict an amount of staged volumes 114 to prepare. An incorrect prediction would result in a fallback workflow or excess staged volumes 114.

In some embodiments, there may be multiple volume pools 120. In some embodiments, a volume pool may be prepared for a top number of most frequently requested public images. In another embodiment, a volume pool may be prepared for a client that uses over a certain number of virtual machines based on a single image. For example, a client that performs nightly encoding using a fleet of virtual machines based on a few volume images 102 may have a volume pool 120 built for each image.

Figure 2:
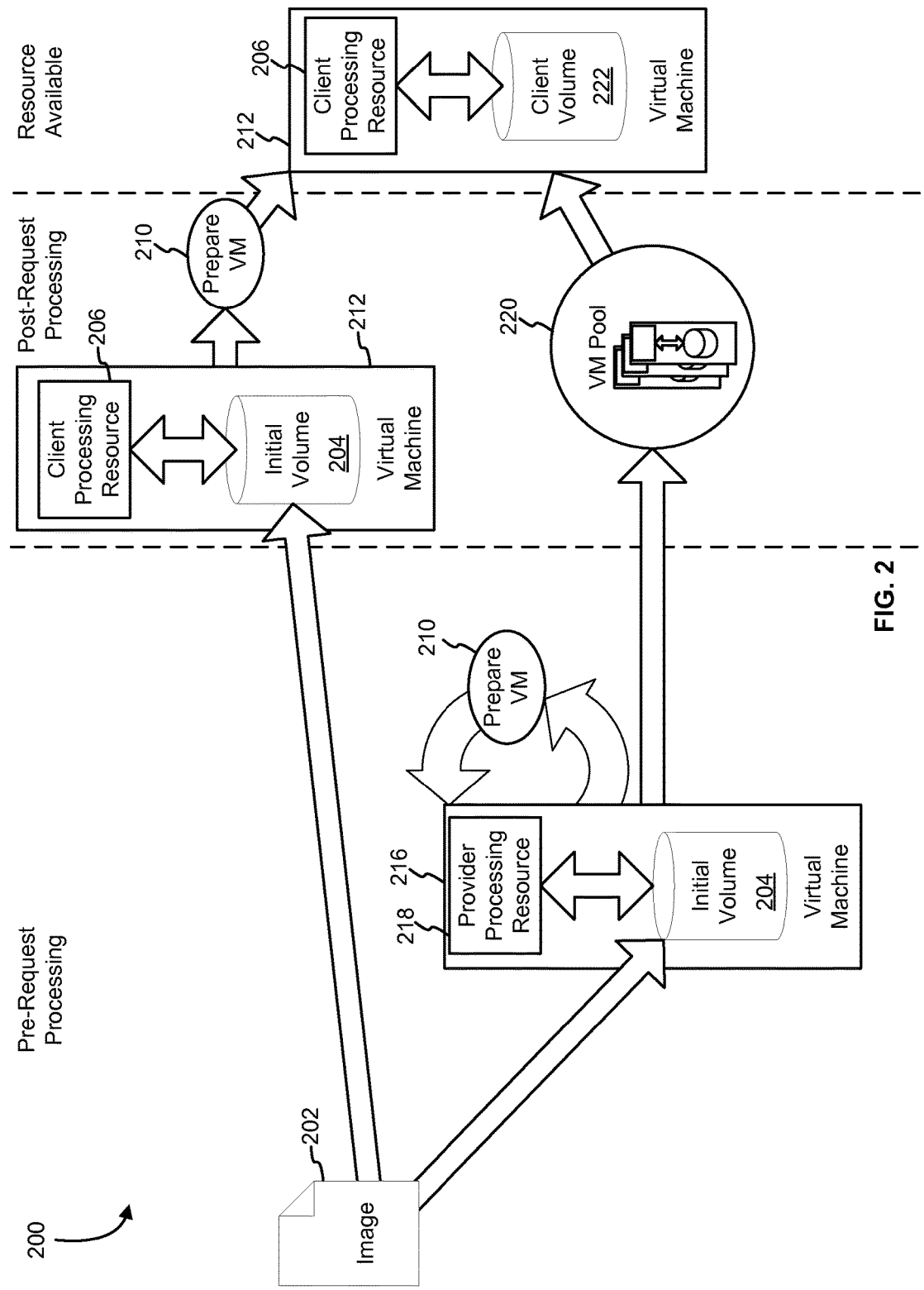
FIG. 2 shows an illustrative example of a system for virtual machine prestaging in accordance with at least one embodiment.

Instead of just preparing a staged volume 114, a virtual machine 116 may also be staged as seen in FIG. 2. A staging system 200 may follow the procedures outlined above of copying an image 202 to an initial volume 204 and connect a provider processing resource 218 to the initial volume 204 to form a virtual machine 216. The virtual machine 216 may then be prepared 210 for staging in a virtual machine pool 220. For example, an operating system on the initial volume 204 may be configured with keys, credentials and/or identifiers. Rather than disconnecting the provider processing resource 218 from the staged volume 214, the provider processing resource 218 and staged volume 214 may remain together as a virtual machine 216 and be made available in the virtual machine pool 220.

Upon receiving a request for a new virtual machine 212, such as a virtual machine 212 having an operating system, the service management system may select a virtual machine 212 from the virtual machine pool 220. The selected virtual machine 220 may then be transferred from the provider account to the client account. The service management system may then provide control of the virtual machine 212 to the client.

The service management system may have a fallback position if the virtual machine pool 220 cannot meet a demand for staged virtual machines 212 or is empty. The image 202 is copied to an initial volume 204. A client processing resource 206 may be connected to the initial volume 204 to form a client virtual machine 212. The client virtual machine 212 may be used to prepare the volume 210, such as for finishing a staging preparation of an operating system. In some embodiments, the image may be streamed to the initial volume 204 such that preparing 210 the initial volume 210 may begin earlier. If a portion of data is requested that is not yet streamed to the initial volume 204, the service management system may request the needed data from the image 202 out of order such that the preparation may continue. After preparing 210 the initial volume 204, the volume may be prepared for use by the client virtual machine 212. The virtual machine 212 may then be turned over to the client control. By using a fallback position, the service management system may still provide virtual machines 212, but at a more extended delay between request of virtual machine 212 and delivery of the virtual machine 212.

Figure 3:
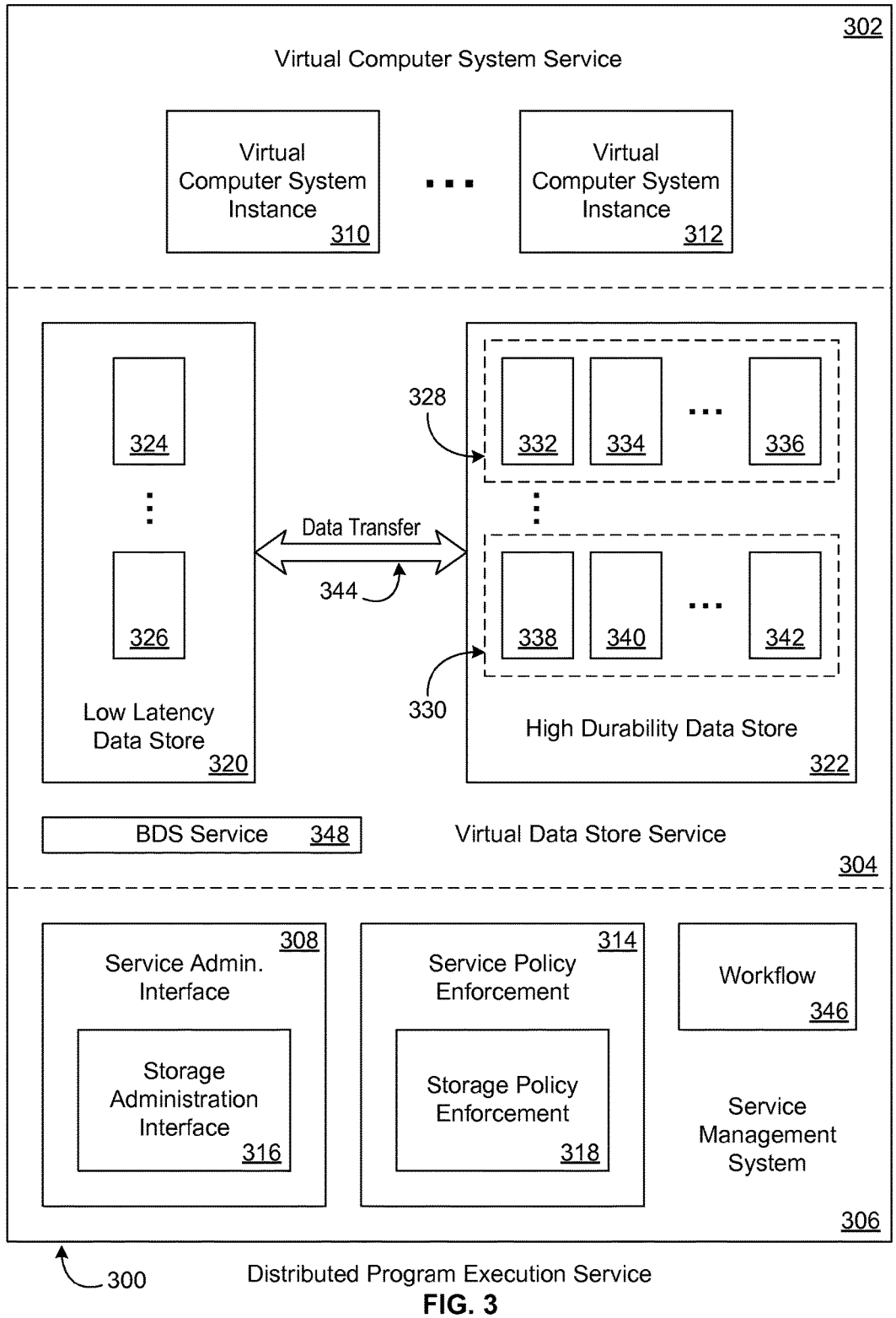
FIG. 3 shows an illustrative example of data center services in accordance with at least one embodiment.

In at least one embodiment, one or more aspects of the environment 100 or 200 may incorporate and/or be incorporated into a distributed program execution service. FIG. 3 depicts aspects of an example distributed program execution service 300 in accordance with at least one embodiment. The distributed program execution service 300 provides virtualized computing services, including a virtual computer system service 302 and a virtual data store service 304, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the virtual machine 112 described above with reference to FIG. 1, one or more data stores such as the initial volume 104 of FIG. 1, as well as communication bandwidth in the interlinking network. The computing resources managed by the distributed program execution service 300 are not shown explicitly in FIG. 3 because it is an aspect of the distributed program execution service 300 to emphasize an independence of the virtualized computing services from the computing resources that implement them.

The distributed program execution service 300 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 300 may supply computing resources elastically and/or on-demand, for example, associated with a per resource unit commodity-style pricing plan.

The distributed program execution service 300 may further utilize the computing resources to implement a service management system 306 configured at least to control the virtualized computing services. The service management system 306 may include a service administration interface 308. The service administration interface 308 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 302 may provision one or more virtual computer system instances 310, 312, such as one or more virtual machines. The user may then configure the provisioned virtual computer system instances 310, 312 to execute the user's application programs. The ellipsis between the virtual computer system instances 310 and 312 indicates that the virtual computer system service 302 may support any suitable number (e.g., thousands, millions, and more) of virtual computer system instances although, for clarity, only two are shown.

The service administration interface 308 may further enable users and/or administrators to specify and/or re-specify virtualized computing service policies. Such policies may be maintained and enforced by a service policy enforcement component 314 of the service management system 306. For example, a storage administration interface 316 portion of the service administration interface 308 may be utilized by users and/or administrators of the virtual data store service 304 to specify virtual data store service policies to be maintained and enforced by a storage policy enforcement component 318 of the service policy enforcement component 314. Various aspects and/or facilities of the virtual computer system service 302 and the virtual data store service 304 including the virtual computer system instances 310, 312, the low latency data store 320, the high durability data store 322, and/or the underlying computing resources may be controlled with interfaces such as application programming interfaces (APIs) and/or Web-based service interfaces. In at least one embodiment, the management system 306 further includes a workflow component 346 configured at least to interact with and/or guide interaction with the interfaces of the various aspects and/or facilities of the virtual computer system service 302 and the virtual data store service 304 in accordance with one or more workflows.

In at least one embodiment, service administration interface 308 and/or the service policy enforcement component 314 may create, and/or cause the workflow component 346 to create, one or more workflows that are then maintained by the workflow component 346.

Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 308. As another example, a policy enforcement workflow may be created from a policy enforcement workflow template configured with parameters by the service policy enforcement component 314.

The workflow component 346 may modify, further specify and/or further configure established workflows. For example, the workflow component 346 may select particular computing resources of the distributed program execution service 300 to execute and/or be assigned to particular tasks. Such selection may be based at least in part on the computing resource needs of the particular task as assessed by the workflow component 346. As another example, the workflow component 346 may add additional and/or duplicate tasks to an established workflow and/or reconfigure information flow between tasks in the established workflow. Such modification of established workflows may be based at least in part on an execution efficiency analysis by the workflow component 346. For example, some tasks may be efficiently performed in parallel, while other tasks depend on the successful completion of previous tasks.

The virtual data store service 304 may include multiple types of virtual data store such as a low latency data store 320 and a high durability data store 322. For example, the low latency data store 320 may maintain one or more data sets 324, 326 which may be read and/or written (collectively, "accessed") by the virtual computer system instances 310, 312 with relatively low latency. The ellipsis between the data sets 324 and 326 indicates that the low latency data store 320 may support any suitable number (e.g., thousands, millions, and more) of data sets although, for clarity, only two are shown. For each data set 324, 326 maintained by the low latency data store 320, the high durability data store 322 may maintain a set of captures 328, 330. Each set of captures 328, 330 may maintain any suitable number of captures 332, 334, 336 and 338, 340, 342 of its associated data set 324, 326, respectively, as indicated by the ellipses. Each capture 332, 334, 336 and 338, 340, 342 may provide a representation of the respective data set 324 and 326 at a particular moment in time. Such captures 332, 334, 336 and 338, 340, 342 may be utilized for later inspection including restoration of the respective data set 324 and 326 to its state at the captured moment in time. Although each component of the distributed program execution service 300 may communicate utilizing the underlying network, data transfer 344 between the low latency data store 320 and the high durability data store 322 is highlighted in FIG. 3 because the contribution to utilization load on the underlying network by such data transfer 344 can be significant.

For example, the data sets 324, 326 of the low latency data store 320 may be virtual disk files (i.e., file(s) that can contain sequences of bytes that represent disk partitions and file systems) or other logical volumes. The low latency data store 320 may include a low overhead virtualization layer providing access to underlying data storage hardware. For example, the virtualization layer of the low latency data store 320 may be low overhead relative to an equivalent layer of the high durability data store 322. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 320 and the high durability data store 322, respectively, are substantially disjoint. In a specific embodiment, the low latency data store 320 could be a Storage Area Network target or the like. In this exemplary embodiment, the physical computer system that hosts the virtual computer system instance 310, 312 can send read/write requests to the SAN target.

The low latency data store 320 and/or the high durability data store 322 may be considered non-local and/or independent with respect to the virtual computer system instances 310, 312. For example, physical servers implementing the virtual computer system service 302 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 310, 312 may have a validity lifetime corresponding to the virtual computer system instance 310, 312, so that if the virtual computer system instance 310, 312 fails or is de-provisioned, the local data is lost and/or becomes invalid. In at least one embodiment, data sets 324, 326 in non-local storage may be efficiently shared by multiple virtual computer system instances 310, 312. For example, the data sets 324, 326 may be mounted by the virtual computer system instances 310, 312 as virtual storage volumes.

Data stores in the virtual data store service 304, including the low latency data store 320 and/or the high durability data store 322, may be facilitated by and/or implemented with a block data storage (BDS) service 348, at least in part. The BDS service 348 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 348 may facilitate and/or implement local caching of data blocks as they are transferred through the underlying computing resources of the distributed program execution service 300 including local caching at data store servers implementing the low latency data store 320 and/or the high durability data store 322, and local caching at virtual computer system servers implementing the virtual computer system service 302. In at least one embodiment, the high durability data store 322 is an archive quality data store implemented independent of the BDS service 348. The high durability data store 322 may work with sets of data that are large relative to the data blocks manipulated by the BDS service 348. The high durability data store 322 may be implemented independent of the BDS service 348. For example, the BDS service 348 may be implemented with distinct interfaces, protocols and/or storage formats.

Each data set 324, 326 may have a distinct pattern of change over time. For example, the data set 324 may have a higher rate of change than the data set 326. However, in at least one embodiment, bulk average rates of change insufficiently characterize data set change. For example, the rate of change of the data set 324, 326 may itself have a pattern that varies with respect to time of day, day of week, seasonally including expected bursts correlated with holidays and/or special events, and annually. Different portions of the data set 324, 366 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

An initial capture 332 of the data set 324 may involve a substantially full copy of the data set 324 and transfer 344 through the network to the high durability data store 322 (may be a "full capture"). In a specific example, this may include taking a snapshot of the blocks that make up a virtual storage volume. Data transferred between the low latency data store 320 and high durability data store 322 may be orchestrated by one or more processes of the BDS service 348. As another example, a virtual disk (storage volume) may be transferred to a physical computer hosting a virtual computer system instance 310. A hypervisor may generate a write log that describes the data and location where the virtual computer system instance 310 writes the data. The write log may then be stored by the high durability data store 322 along with an image of the virtual disk when it was sent to the physical computer.

For example, a capture 332, 334, 336 of the data set 324 may include read access of a set of servers and/or storage devices implementing the low latency data store 320, as well as write access to update metadata, for example, to update a data structure tracking "dirty" data blocks of the data set 324. For the purposes of this description, data blocks of the data set 324 are dirty (with respect to a particular class and/or type of capture) if they have been changed since the most recent capture (of the same class and/or type). Prior to being transferred 344 from the low latency data store 320 to the high durability data store 322, capture 332, 334, 336 data may be compressed and/or encrypted by the set of servers. At the high durability data store 322, received capture 332, 334, 336 data may again be written to an underlying set of servers and/or storage devices. Thus each capture 332, 334, 336 involves a load on finite underlying computing resources including server load and network load. It should be noted that captures may be stored in numerous ways. Captures may be stored in any data store capable of storing captures including, but not limited to, low-latency data stores and the same data stores that store the data being captured.

Captures 332, 334, 336 of the data set 324 may be manually requested, for example, utilizing the storage administration interface 316. In at least one embodiment, the captures 332, 334, 336 may be automatically scheduled in accordance with a data set capture policy. Data set capture policies in accordance with at least one embodiment may be specified with the storage administration interface 316, as well as associated with one or more particular data sets 324, 326. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

In some embodiments, data sets 324, 326 with specific information may be created and stored by the service management system 306 and distributed to virtual computer system instances 310, 312 upon request. A service management system may determine that a capture 338 is frequently requested as part of provisioning a new virtual computer system instance. Instead of waiting on a request to copy the capture 338 to a data set 324, 326 in a low latency data store 320, the service management system 306 may copy the capture 338 to one or more data sets 324, 326 in the low latency data store 320 before receiving a request. As some customization may be necessary when attaching the data set 324, 326 to a virtual computer system instance 310, 312, the service management system 306 may connect the data sets 324, 326 to virtual computer system instances 310, 312 that are managed by the service management system 306. The service management system may then perform the customizations necessary to the data sets 324, 326 and then disconnect the virtual computer system instances 310, 312 from the data sets 324, 326. The data sets 324, 326 may be held in an active state in the low latency data store 320 until a request from a client for the data set 324, 326 and/or a virtual computer system instance 310 is received. When the request is received, the service management system 306 may change the control of a data set 324, 326 to the requestor or the client. By giving an active data set 324, 326, the time cost of data transfer 344 and customization has been reduced.

For example, the capture 338 may be an operating system image that has been generalized for multiple installs, such as an installation of Windows® that has used Microsoft® Sysprep software. The operating system image may then be downloaded onto a data set 324, such as a volume, in a low latency data store 320. The volume may then be connected to a virtual computer system instance 310 under the control of the service management system 306. The service management system 306 may cause the virtual computer system instance 310 to boot and finish preparation of the operating system. The service management system 306 may then disconnect the virtual computer system instance 310 from the volume. The volume may remain active in the low latency data store 320 without a connection to a virtual computer system instance 310 until a client requests a virtual computer system instance with the operating system. In response to the request, the service management system 306 may change the control of the volume to the client and assign a virtual computer system instance 310 to the client with a connection to the volume.

In some embodiments, instead of disconnecting the volume from the virtual computing system instance 310, the virtual computing system instance 310 remains connected to the volume. When the client requests a new virtual computing system instance 310 with an operating system, the virtual computing system instance 310 and the volume may be transferred to the client account. This transfer may help further reduce a time of request to a usable instance by providing an active virtual computing system instance 310 with an operating system in an active state.

Figure 4:
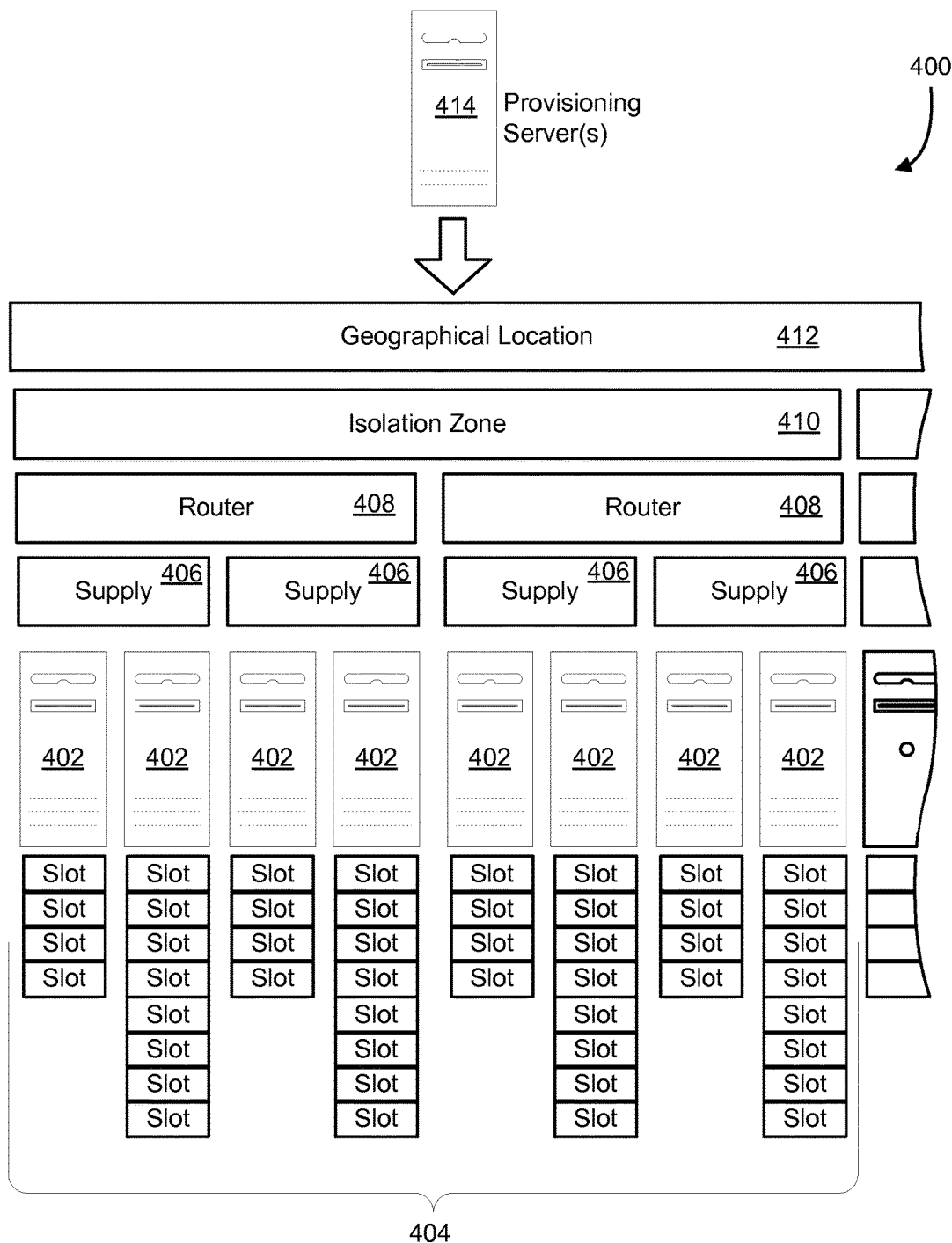
FIG. 4 shows an illustrative example of a data center in accordance with at least one embodiment.

Computing resources may exist in a datacenter such as the one described in FIG. 3. In some embodiments, such as in FIG. 4, a data center 400 may be viewed as a collection of shared computing resources and/or shared infrastructure. For example, as shown in FIG. 4, a data center 400 may include virtual machine slots 404, physical hosts 402, power supplies 406, routers 408, isolation zones 410 and geographical locations 412. A physical host 402 may be shared by multiple virtual machine slots 404, each slot 404 capable of holding a virtual machine, such as a guest domain. Multiple physical hosts 402 may share a power supply 406, such as a power supply 406 provided on a server rack. A router 408 may service multiple physical hosts 402 across several power supplies 406 to route network traffic. An isolation zone 410 may service many routers 408, the isolation zone 410 being a group of computing resources that is serviced by redundancies such as backup generators. Multiple isolation zones 410 may reside at a geographical location 412, such as a data center 400. A provisioning server 414 may include a memory and processor configured with instructions to analyze user data and rank available implementation resources using determined roles and shared resources/infrastructure in the calculation. The provisioning server 414 may also manage workflows for provisioning and deprovisioning computing resources as well as detecting health and/or failure of computing resources.

A provisioning server 414 may determine a placement of the resource within the data center. In some embodiments, this placement is based at least in part on available computing resources and/or relationships between computing resources. In one embodiment, the distance between resources may be measured by the degree of shared resources. This distance may be used in the ranking of resources according to role. For example, a first system on a host 402 that shares a router 408 with a second system may be more proximate to the second system than to a third system only sharing an isolation zone 410. Depending on an application, it may be desirable to keep the distance low to increase throughput or high to increase durability. In another embodiment, the distance may be defined in terms of unshared resources. For example, two slots 404 sharing a router 408 may have a distance of a physical host 402, and a power supply 406. Each difference in resources may be weighted differently in a distance calculation.

A placement calculation may also be used when selecting a prepared resource to transfer to a client account. In one embodiment, a client requests a virtual machine having an operating system. The provisioning server 414 may determine that the request may be satisfied with a staged volume in a slot 404. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 414 may determine a placement near other existing volumes is desirable for latency concerns. Therefore, the decision may find that sharing a router 408 desirable, but sharing a supply 406 and physical host 402 is undesirable. A volume in the pool may then be selected that matches these attributes and placed preferably on a same router 408 as the other volumes, but not the same physical host 402 or power supply 406. In other examples of placement decisions, such as those relating to a database shard, sharing of infrastructure may be less desirable and a volume may be selected that has less infrastructure in common with other related volumes.

Figure 5:
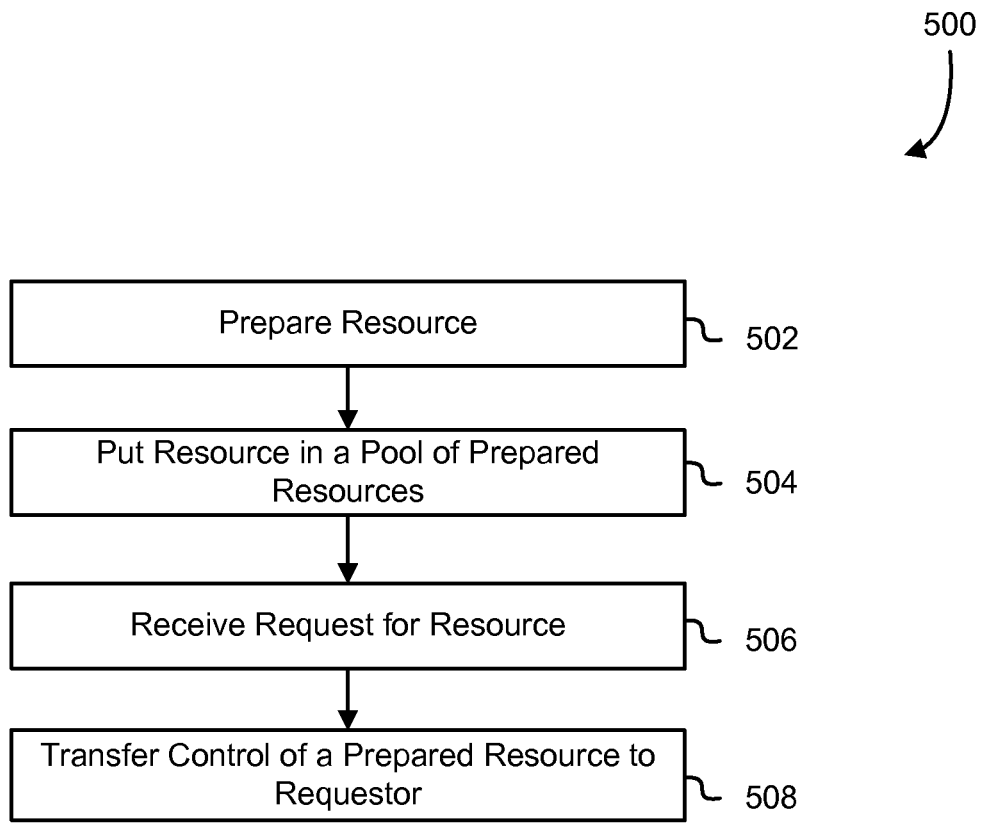
FIG. 5 shows an illustrative example of a process that may be used to stage resources in accordance with at least one embodiment.

FIG. 5 shows an illustrative example of a process that may be used to stage resources in accordance with at least one embodiment. The process 500 may be accomplished by computing resources such as those seen in FIG. 1, including image 102, provider virtual machine 116, initial volume 104, provider processing resource 118, customer virtual machine 112, customer processing resource 106 and volume pool 120. A provider may perform 502 a staging preparation on a computing resource. In some embodiments, this may be the preparation of an operating system by the service management system. The computing resource may be put 504 in a set of prepared resources, such as a pool of volumes with a prepared operating system. The provider may receive 506 a request for a prepared resource, such as a request for a virtual machine having an operating system. In response, the provider may transfer 508 control of the resource to the requestor.

For example, a service management system in a storage system of a program execution environment may provide a pool of volumes with an operating system. To replenish volumes in the pool, the service management system may provision a new volume using an operating system image and connect the volume to a virtual host having processing time on a CPU. Using the processing time, the virtual host may perform tasks necessary to finish the preparation of the operating system on the volume. The virtual host may then be disconnected from the volume and the volume placed in the pool. A client may request a volume from the pool. In response to the request, the service management system may select a volume from the pool to transfer to the client account. The volume may also be connected to a virtual host having time on a CPU, forming a virtual machine. The virtual machine may then be booted into the operating system and transferred to the control of the client.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
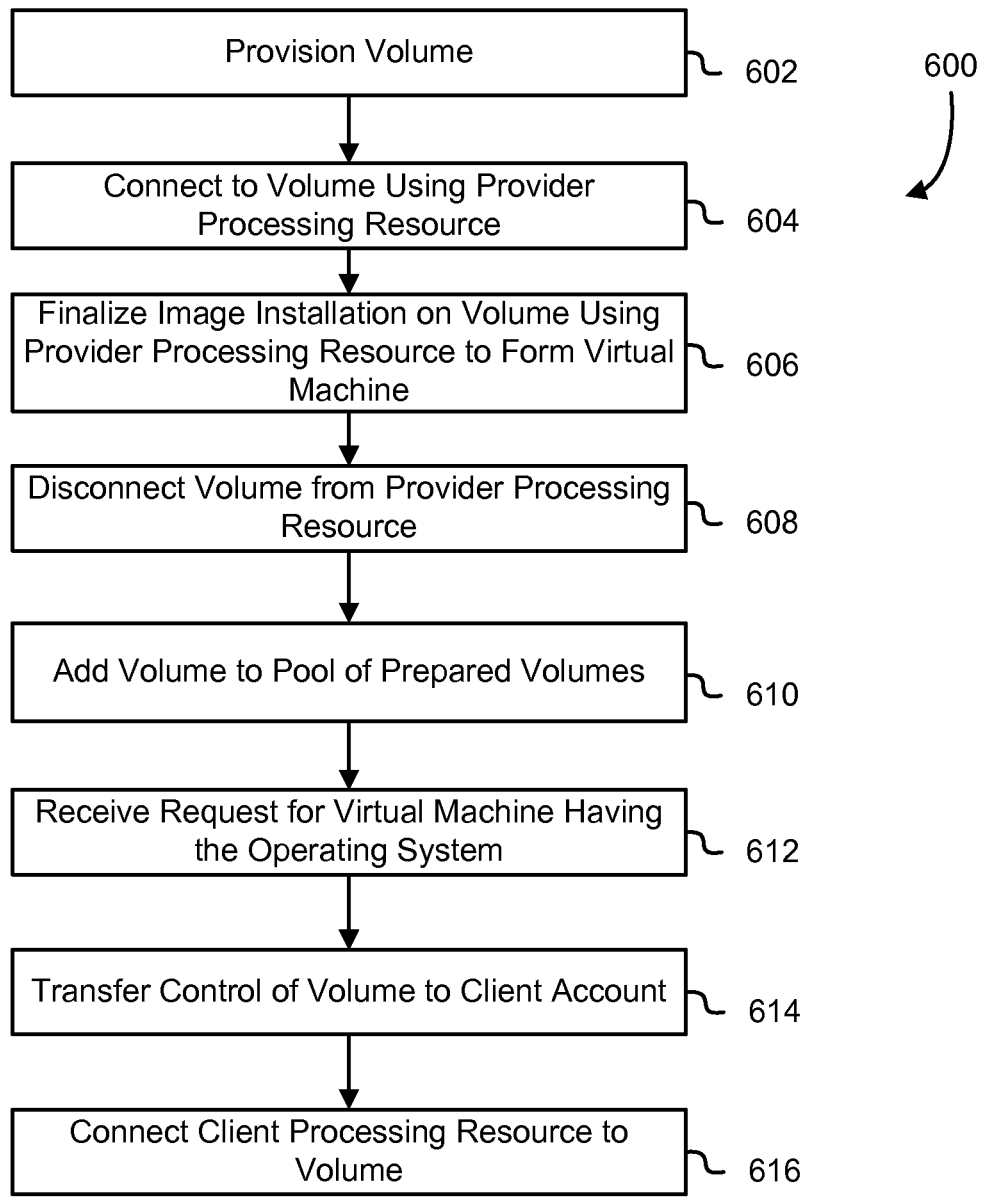
FIG. 6 shows an illustrative example of a process that may be used to stage volumes in accordance with at least one embodiment.

Turning now to FIG. 6, an illustrative example of a process that may be used to stage volumes in accordance with at least one embodiment is shown. The process 600 may be accomplished by computing resources such as those seen in FIG. 1, including image 102, provider virtual machine 116, initial volume 104, provider processing resource 118, customer virtual machine 112, customer processing resource 106 and volume pool 120. In order to replenish a pool of staged volumes, new volumes may be staged. To stage a new volume, a volume may be provisioned 602. The volume may be connected 604 to a provider processing resource, such as a host providing a shared CPU. The provider processing resource may then prepare 606 an operating system on the volume for use. After preparation, the volume may be disconnected 608 from the processing resource. The volume may then be added 610 to a pool of staged volumes. When a request is received 612 for a virtual machine having an operating system, a service management system may transfer 614 control of a matching volume from the pool to the client account. The service management system may also connect 616 a client processing resource to the volume.

Figure 7:
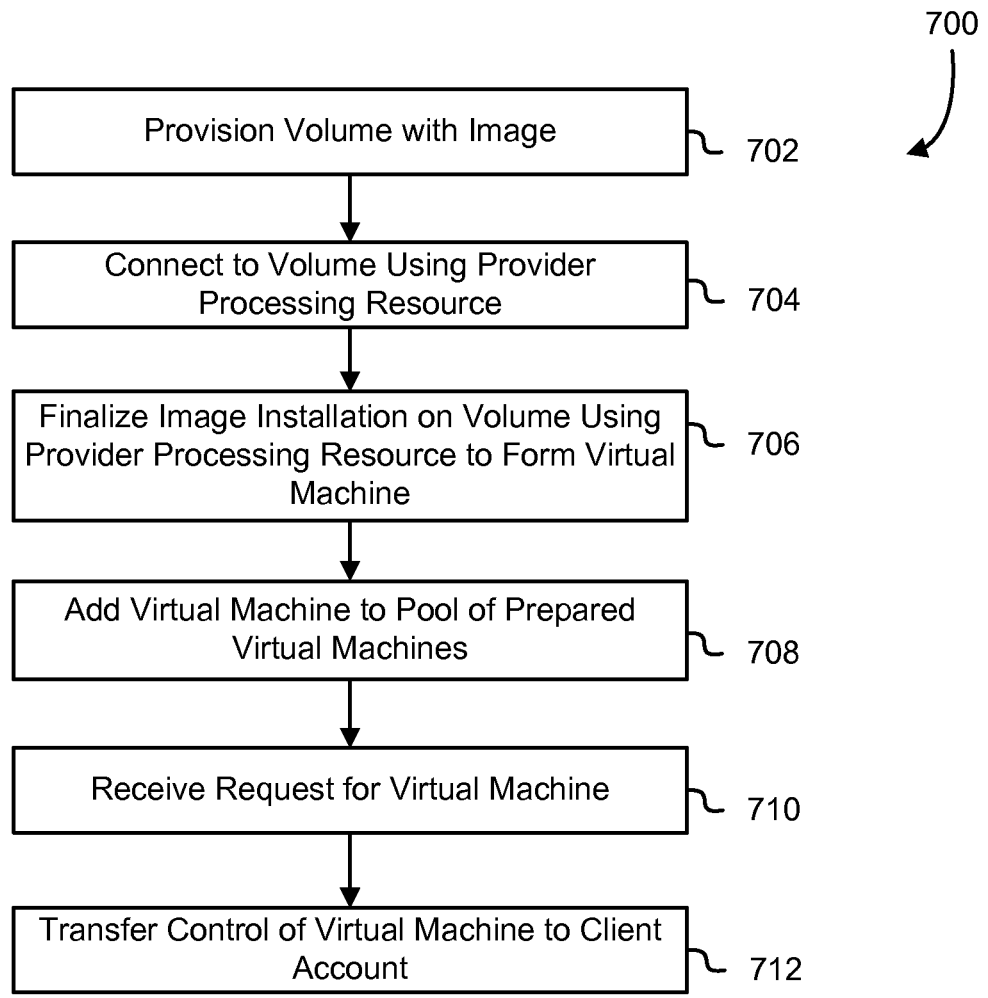
FIG. 7 shows an illustrative example of a process that may be used to stage virtual machines in accordance with at least one embodiment.

Instead of a volume, a virtual machine may also be staged for release to client. In FIG. 7, an illustrative example of a process that may be used to stage virtual machines in accordance with at least one embodiment is shown. The process 700 may be accomplished by computing resources such as those seen in FIG. 2, including image 202, provider virtual machine 216, initial volume 204, provider processing resource 218, customer virtual machine 212, customer processing resource 206 and virtual machine pool 220. A volume may provisioned 702 with an image installed thereon. The volume may be connected 204 with a provider processing resource to form a virtual machine. The virtual machine may then finalize 706 the image preparation on the volume using the provider processing resource. The virtual machine may then be added 708 to a set of staged virtual machines, such as a pool of virtual machines having an operating system. In response to receiving 710 a request for a virtual machine, a service management system may transfer 712 control of the virtual machine to a client account.

Figure 8:
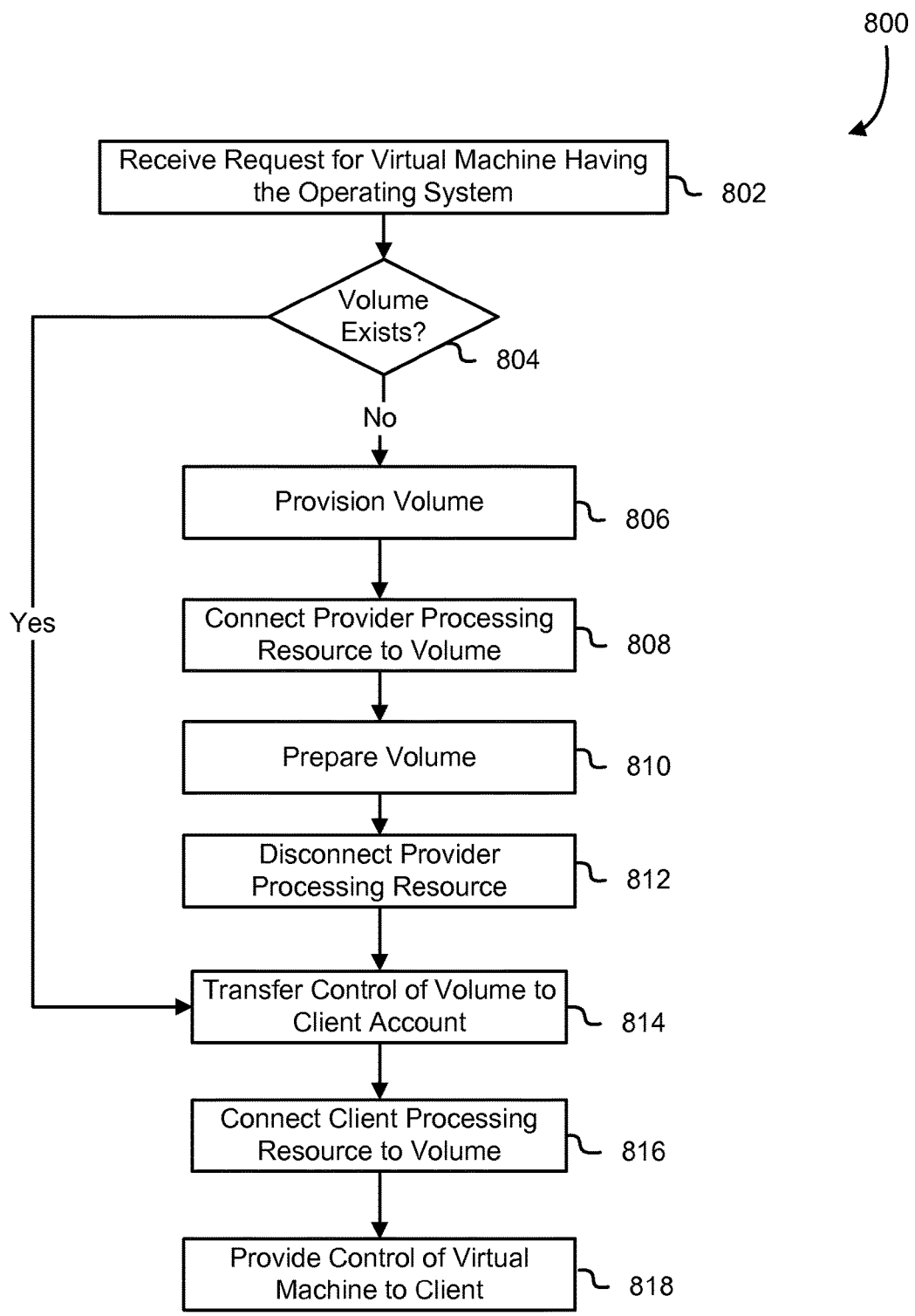
FIG. 8 shows an illustrative example of a process that may be used to provide staged volumes in accordance with at least one embodiment.

In some examples, the pool of prepared resources may not have sufficient resources to return to clients in response to requests for the prepared resources. The service management system may then turn to a fallback position. Turning now to FIG. 8, an illustrative example of a process that may be used to provide staged volumes in accordance with at least one embodiment is shown. The process 800 may be accomplished by computing resources such as those seen in FIG. 1, including image 102, provider virtual machine 116, initial volume 104, provider processing resource 118, customer virtual machine 112, customer processing resource 106 and volume pool 120. A service management system may receive 802 a request for a virtual machine having an operating system. If the volume does not exist 804 yet, a fallback position may be used in which the volume is provisioned 806. A provider processing resource may be connected 808 to the volume. Preparation of the operating system on the volume may be performed 810. In some embodiments, preparation may be through copying an image to the volume and configuring the image on the volume. In other embodiments, preparation of an operating system may include installing the operating system from an image. The provider resource may then be disconnected 812. The volume may then be transferred 814 to the client account from the provider account. A client processing resource may then be connected 816 to the volume. The service management system may then provide 818 control of the virtual machine to the client. In some embodiments, the provider processing resource is not disconnected if the provider processing resource matches the client request, but is transferred with the volume to a client account.

If the volume does exist 804, operations 806 to 812 may be skipped and the corresponding delay may be avoided by using a prepared volume from a pool of volumes. Instead, the volume may be transferred 814 to the client account. A client processing resource may be connected 816 by the service management system to the volume to form a virtual machine. Control of the virtual machine may be provided 818 to the client.

Figure 9:
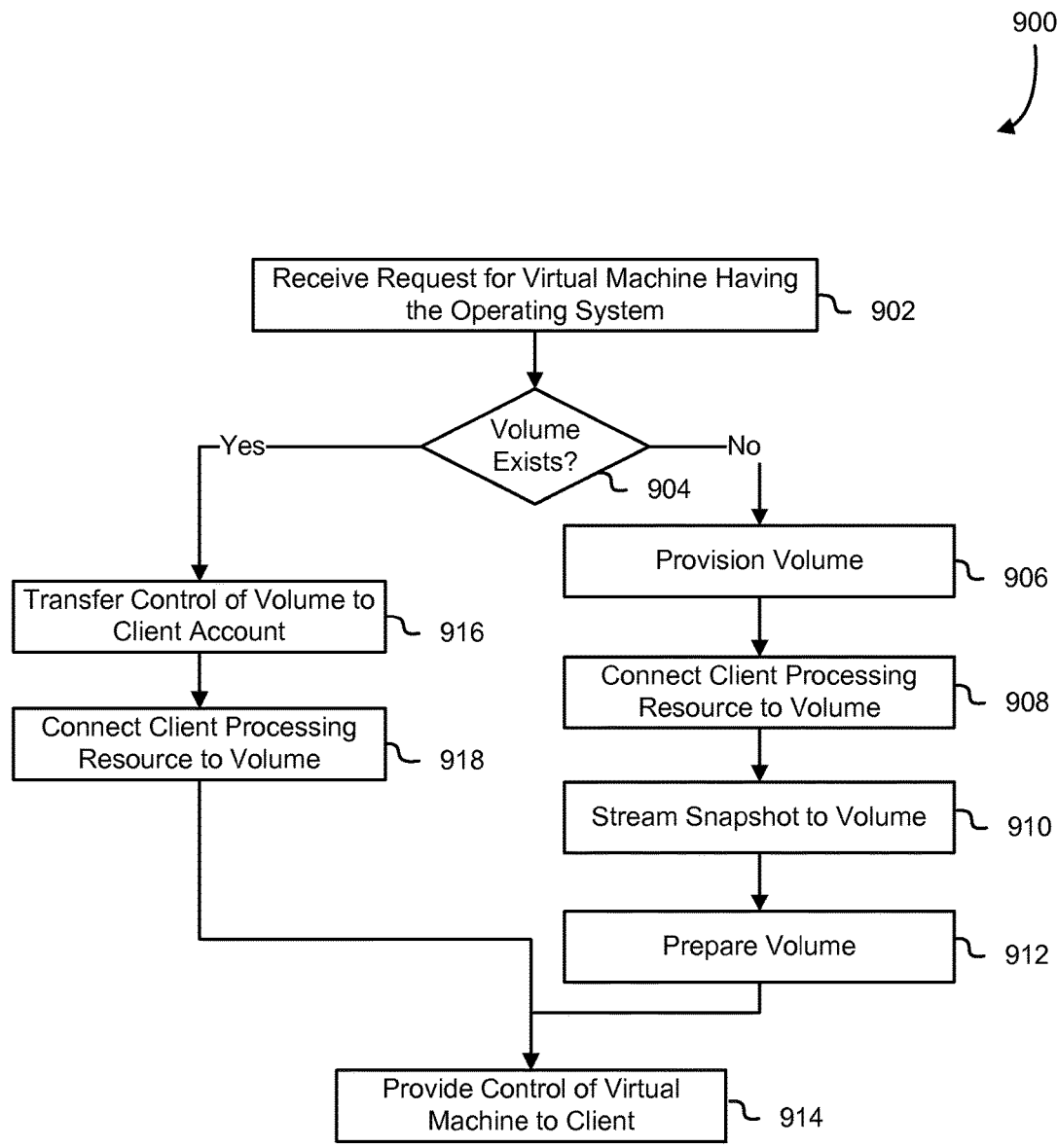
FIG. 9 shows an illustrative example of an alternate process that may be used to provide staged volumes in accordance with at least one embodiment.

In some embodiments, the fallback position is to use a client processing resource to perform a preparation of the volume for use instead of a provider processing resource. For example, FIG. 9 shows an illustrative example of an alternate process that may be used to provide staged volumes in accordance with at least one embodiment. The process 900 may be accomplished by computing resources such as those seen in FIG. 1, including image 102, provider virtual machine 116, initial volume 104, provider processing resource 118, customer virtual machine 112, customer processing resource 106 and volume pool 120. A request may be received 902 to provide a virtual machine having an operating system. If the volume does not exist 904, a fallback position may be used. The volume may be provisioned 906. A client processing resource specified by the client may be connected 908 to the volume. The image, such as a snapshot, may be streamed 910 to the volume. As soon as enough information has been streamed to the volume, preparation of the volume may be performed 912 by the processing resource. If processing resource lacks information, the stream may be interrupted and the missing data may be retrieved out of order. After providing the out-of-order data, the stream may return to streaming the snapshot. After preparation, the client may be provided 914 control of the virtual machine that includes the client processing resource and the volume.

If the volume does exist 904, operations 906 to 912 may be avoided and the corresponding delay may be reduced. Instead, control of the volume may be transferred 916 to the client account. A client processing resource may be connected 918 by the service management system to the volume to form a virtual machine. Control of the virtual machine may also be provided 914 to the client.

Figure 10:
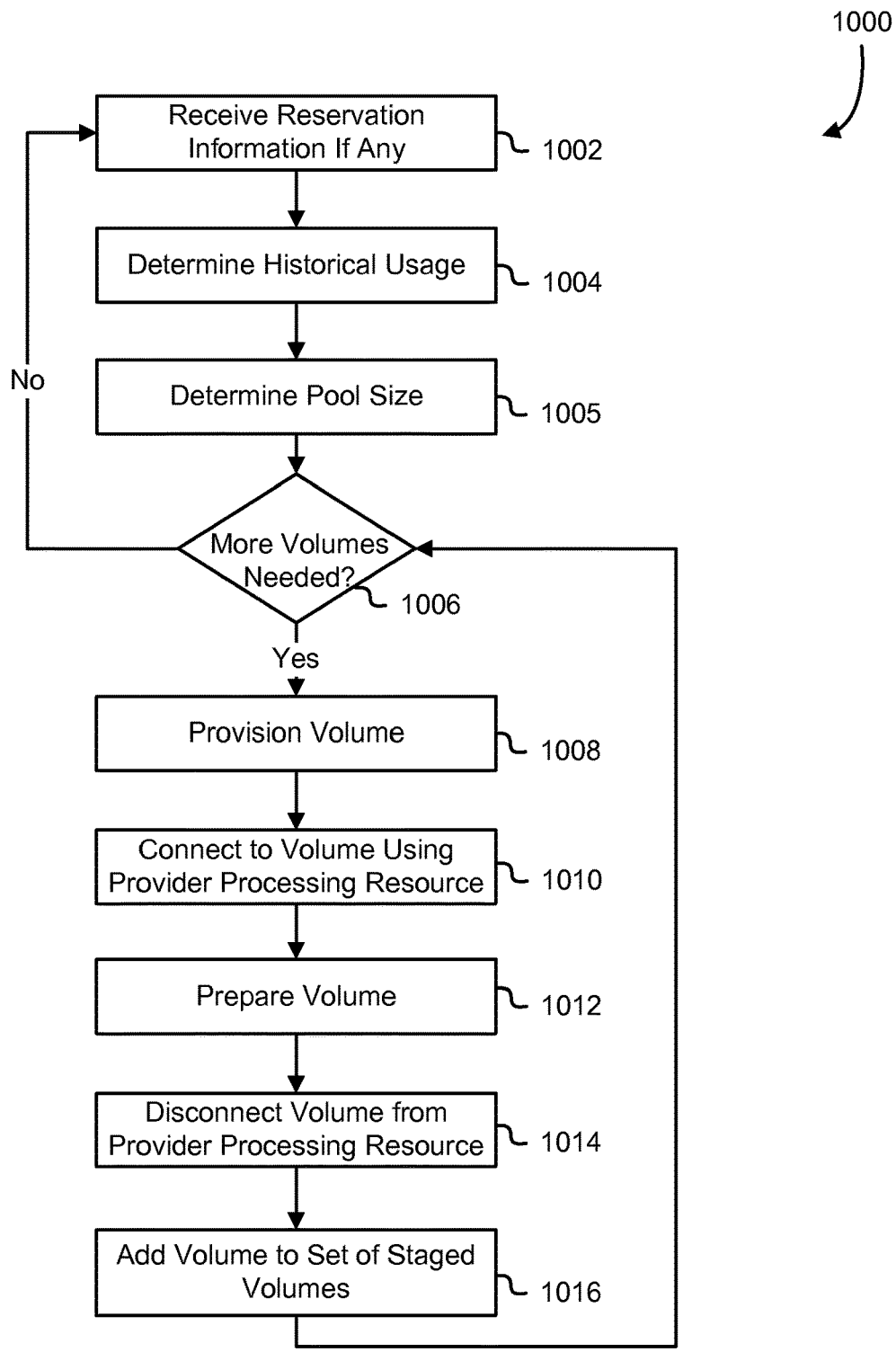
FIG. 10 shows an illustrative example of a process that may be used to stage volumes in accordance with at least one embodiment.

The number of resources in a resource pool may be based on predicted resource usage such as seen in FIG. 10. The process 1000 may be accomplished by computing resources such as those seen in FIG. 1, including image 102, provider virtual machine 116, initial volume 104, provider processing resource 118, customer virtual machine 112, customer processing resource 106 and volume pool 120. Resource reservations may be received 1002 and historical usage of volumes using an image may be determined 1004. In some embodiments, resource reservations may be requested by a client that knows its future resource requirements. For example, a client may request 100 virtual machines based on an image be made available in two days as the client may know that it will be receiving 100 media files to transcode in two days. Using the reservation information and/or the historical usage information, a pool size may be determined 1005. The pool size may be a number of virtual machines and/or volumes to prepare. If more volumes are not needed 1006 in the pool, a service management system may return to determining if more are needed through operations 1002 to 1004. If more volumes are needed 1006, then the volumes may be staged. The volume may be provisioned 1008, may be connected 1010 with a provider processing resource and may receive an image of an of operating system. The provider processing resource can prepare 1012 the volume for use. The provider processing resource may be disconnected 1014 from the provider processing resource after preparation. The prepared volume may be added 1016 to the set of staged volumes, or pool. Operations 1008 to 1016 may then be repeated until the predicted amount of volumes is reached.

Figure 11:
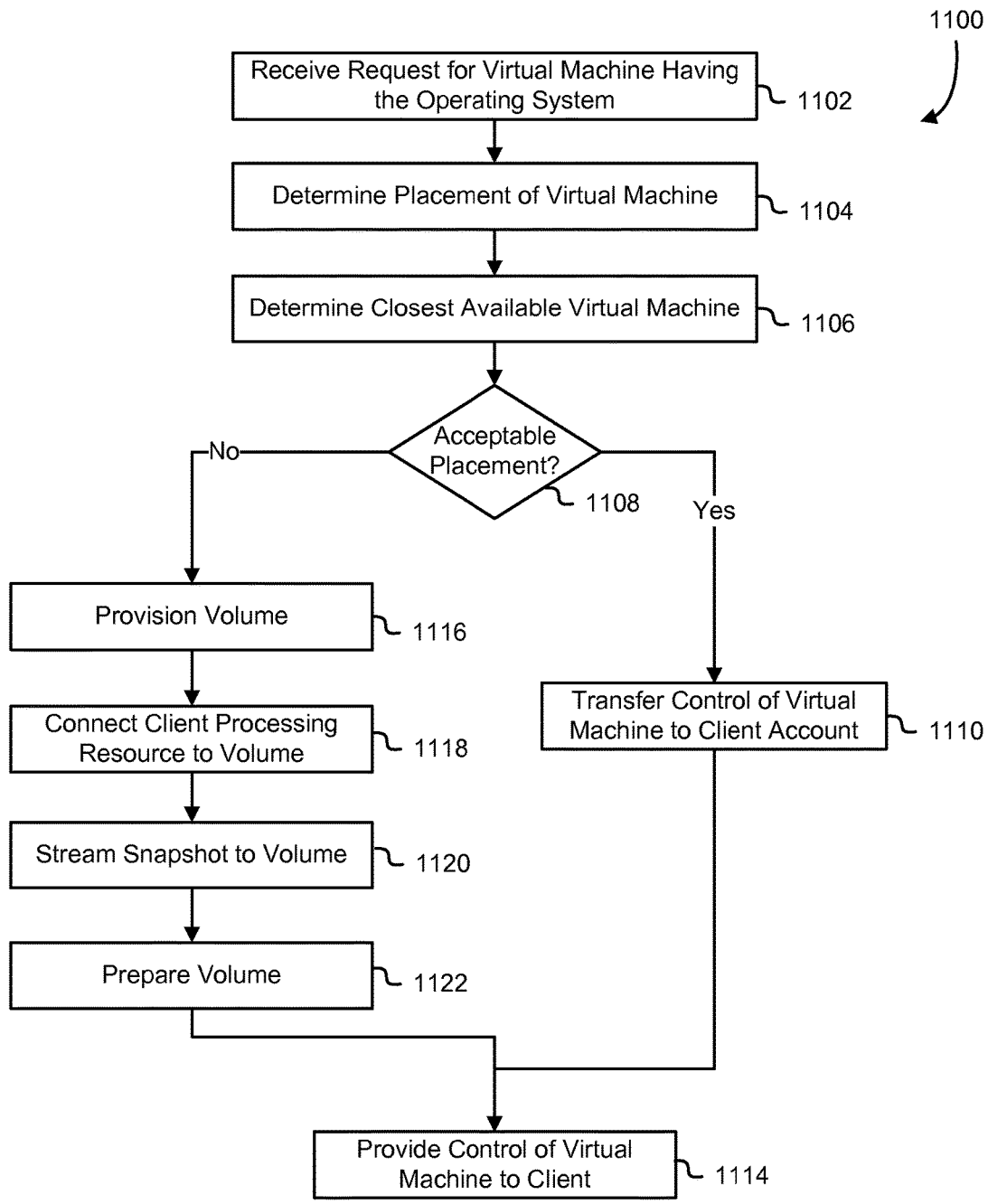
FIG. 11 shows an illustrative example of a process that may be used to provide staged volumes with a placement decision in accordance with at least one embodiment.

Placement in a data center may also be part of a consideration in using a pool of resources. FIG. 11 shows an illustrative example of a process that may be used to provide staged virtual machines with a placement decision in accordance with at least one embodiment. The process 1100 may be accomplished by computing resources such as those seen in FIG. 2, including image 202, provider virtual machine 216, initial volume 204, provider processing resource 218, customer virtual machine 212, customer processing resource 206 and volume pool 220. In some embodiments, volumes in the pool may be provisioned to represent a diversity of machines within the data center. In the embodiment shown, a placement decision may be respected by selecting for placement on a virtual machine having a closest match to the desired attributes of the placement decision.

A service management system may receive 1102 a request for a virtual machine having an operating system. A placement decision may be determined 1104 as if a new virtual machine would be provisioned. A closest virtual machine in the pool may be determined 1106. If the placement is acceptable 1108, the service management system may transfer 1110 the prepared virtual machine to a client account. The virtual machine may then be turned over 1114 to the client for control. However, if the placement is not acceptable 1108, a fallback position may be used. The service management system may provision 1116 the volume and connect a client processing resource to the volume. The snapshot may be streamed 1120 to the volume and preparation performed 1122, such as preparation of an operating system. Once complete, the virtual machine may be turned over 1114 to the client for control.

Figure 12:
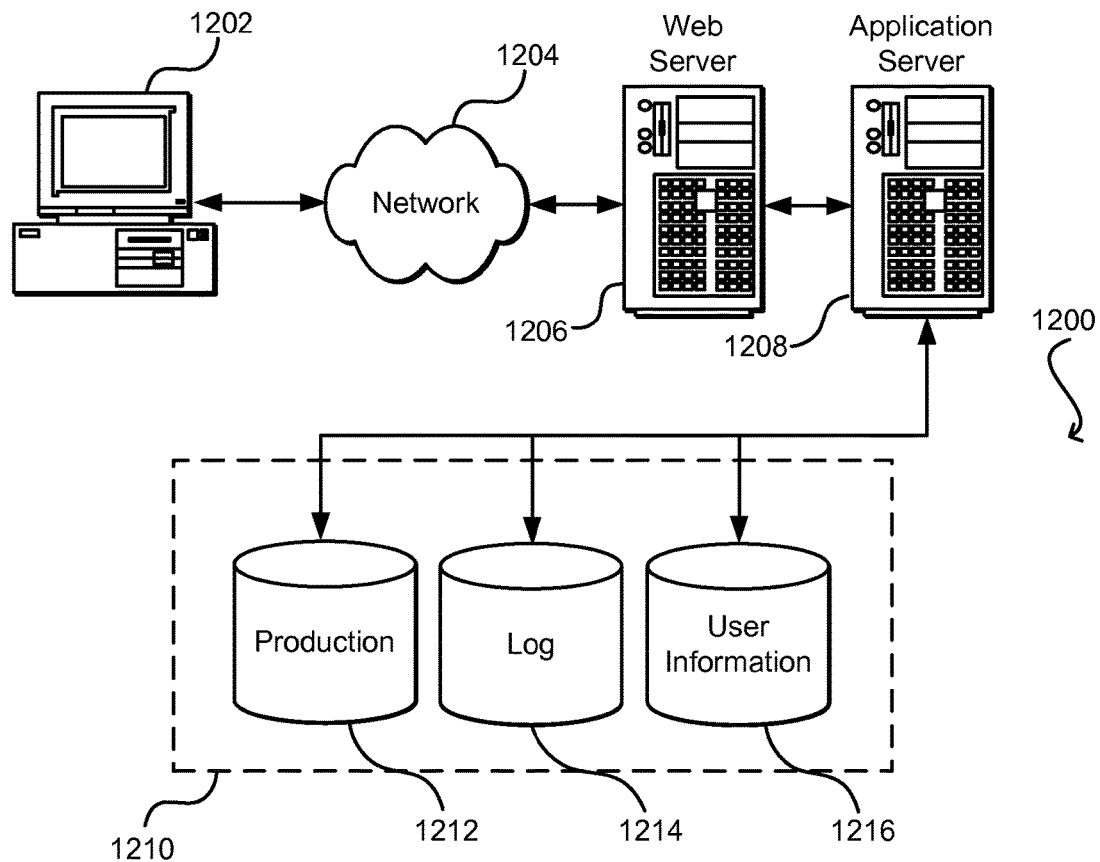
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing storage, comprising:
    predicting a number of volume images to be requested based at least in part on usage information associated with the volume images, at least a portion of the volume images having an operating system;
    providing a set of staged volume images based at least in part on the number, the set of staged volume images provided prior to receiving a request of a client associated with using the operating system, the providing of the set of staged volume images comprising:
        copying the operating system to a volume;
        operationally connecting the volume of the set of staged volume images to a system processing resource in a program execution environment under a provider account;
        performing, by the system processing resource, at least part of a staging of the operating system while connected to the system processing resource, the performance of the staging comprising:
            generating system-specific information comprising at least one of a key, a credential, or an identifier specific to the volume,
            causing the operating system to be booted by the system processing resource, and
            configuring the operating system with the system specific information;
        disconnecting the volume from the system processing resource at a time after performing the at least part of the staging; and
        adding the volume to a set of staged volumes based at least in part on the volume being disconnected from the system processing resource;
    receiving the request from the client;
    removing the volume from the set based at least in part on the request being received;
    changing an allocation of the volume from the provider account to a client account of the client; and
    connecting the volume to a client processing resource based at least in part on the allocation.

2. The computer-implemented method of claim 1, further comprising transferring a volume image of the volume images to the volume for use in the at least part of the staging.

3. The computer-implemented method of claim 2, wherein transferring the volume image further comprises transferring the volume image hosted in a high durability data store to the volume hosted in a low-latency data store.

4. The computer-implemented method of claim 1, further comprising generalizing an instance of a computing system to a volume image of the volume images for use for cloning the instance on other computing systems.

5. A computer-implemented method for storage management, comprising:
    predicting a number of data storage containers to be requested based at least in part on usage information associated with the data storage containers;
    performing, based at least in part on the number of data storage containers predicted to be requested, at least part of a system preparation on a data storage container of the data storage containers prior to a request of a client for the data storage container, performing the at least part of the system preparation comprising:

copying an operating system to the data storage container;
generating system-specific information comprising at least one of a key, a credential, or an identifier specific to the data storage container; and
configuring the operating system with the system-specific information;
adding the data storage container to a set of staged data storage containers;
receiving the request for the data storage container with the at least part of the system preparation;
removing the data storage container from the set after receiving the request; and
changing an allocation of the data storage container to a client account of the client.

6. The computer-implemented method of claim 5, further comprising:
receiving a second request for a second data storage container with the system preparation;
determining that the set is insufficient to satisfy the second request;
provisioning the second data storage container;
performing the at least part of the system preparation on the second data storage container; and
changing an allocation of the second data storage container to a second client account.

7. The computer-implemented method of claim 5, wherein performing the at least part of the system preparation on the data storage container further comprises installing an application on the data storage container.

8. The computer-implemented method of claim 5, wherein generating the key comprises performing cryptographic operations.

9. A computer system for providing computing resources, comprising:
one or more computing resources having one or more processors and memory including executable instructions that, when executed by the one or more processors, cause the one or more processors to implement at least:
a plurality of volumes;
a staging server configured to:
perform, based at least in part on a predicted number of the plurality of volumes, system preparation on the plurality of volumes based at least in part on the number to form staged volumes, performance of the system preparation causing the staging server to:
copy an operating system to a volume of the plurality of volumes;
generate system-specific information comprising at least one of a key, a credential, or an identifier specific to the volume; and
configure the operating system with the system-specific information; and
add the staged volumes to a set of staged volumes prior to a request of a client for one or more of the staged volumes, the number of the plurality of volumes predicted based at least in part on usage information associated with the plurality of volumes; and
a provisioning system configured to determine whether the client is allocated, based at least in part on the request, a staged volume from the set of staged volumes or causes a second volume to receive system preparation.

10. The computer system of claim 9, wherein the staging server forms part of a set of staging servers that are used to perform system preparation on volumes.

11. The computer system of claim 9, wherein a processing resource of the staging server is more capable than a client processing resource configured to receive the staged volume.

12. The computer system of claim 9, wherein the provisioning system further comprises a placement system that selects the volume from the set of staged volumes based at least in part on shared infrastructure with other client volumes.

13. The computer system of claim 9, further comprising a plurality of sets of staged volumes, each set of staged volumes based at least in part on a different system image.

14. One or more non-transitory computer-readable storage media having collectively stored thereon executable instructions that, when executed by one or more processors, cause the one or more processors to at least:
predict a number of computing systems to be requested based at least in part on usage information associated with the computing systems;
perform, based at least in part on the number, at least part of a preparation of an operating system on a computing system of the computing systems prior to a client request associated with the computing system, the computing system comprising a processing resource and a storage resource under a provider account, the performance of the preparation of the operating system causing the one or more processors to:
generate system-specific information comprising at least one of a key, a credential, or an identifier specific to the computing system;
cause the operating system to be booted by the processing resource; and
configure the operating system with the system specific information;
add the computing system to a set of active computing systems;
receive a request for an active computing system matching attributes of the computing system; and
change an allocation of the computing system from the provider account to a client account.

15. The non-transitory computer-readable storage media of claim 14, wherein the instructions further comprise instructions that, when executed, cause the one or more processors to at least:
finalize the at least part of the preparation of the operating system based at least in part on the request received before changing the allocation.

16. The non-transitory computer-readable storage media of claim 14, wherein the attributes further comprise capabilities of the processing resource, operating system or storage resource capabilities.

17. The non-transitory computer-readable storage media of claim 15, wherein the instructions further comprise instructions that, when executed, cause the one or more processors to at least resize a storage resource of the computing system based at least in part on the request.

18. The computer-implemented method of claim 1, wherein predicting the number comprises: generating the number based at least in part on analyzing one of: historical requests associated with the volume images or scheduled requests associated with the volume images, wherein the number indicates a size of the set of staged volumes and a plurality of operating systems associated with the set of staged volumes.

19. The computer-implemented method of claim 1, wherein disconnecting the volume from the system processing resource comprises maintaining the volume active prior to receiving the request of the client by at least connecting the volume to another computing resource of the program execution environment.

20. The computer-implemented method of claim 1, further comprising:
  receiving an additional request of the client for an additional volume associated with an additional volume image;
  determining that the set of staged volumes is insufficient to satisfy the additional request;
  preparing, based at least in part on the set of staged volumes being insufficient, the additional volume by at least:
    streaming the additional volume image to a processing resource associated with the additional volume;
    during execution of the streaming, receiving a data request for a portion of the additional volume image, the data request being received from the processing resource; and
    delivering the portion of the additional volume image to the processing resource in response to the data request, the delivery of the portion of the additional volume image enabling the preparation of the additional volume to continue prior to the additional volume image being fully delivered to the processing resource, the portion of the volume image being delivered out of order with respect to the additional volume image; and
  allocating the additional volume to the client based at least in part on the additional volume being prepared.

21. The one or more computer-readable storage media of claim 14, wherein adding the computing system to the set of active computing system comprises: maintaining the processing resource of the computing system active, and wherein changing the allocation of the computing system to the client account comprises: transferring control of the processing resource to the client account based at least in part on the processing resource being active.

22. The computer-implemented method of claim 1, further comprising:
  determining a degree of shared resources between at least one other client resource and an individual volume of the set of staged volumes; and
  selecting the individual volume to fulfill the request based at least in part on the determined degree of shared resources.

* * * * *